June 20, 1961 M. STAUNT 2,988,815
DENTAL HAND PIECES
Filed Nov. 5, 1956 4 Sheets-Sheet 1
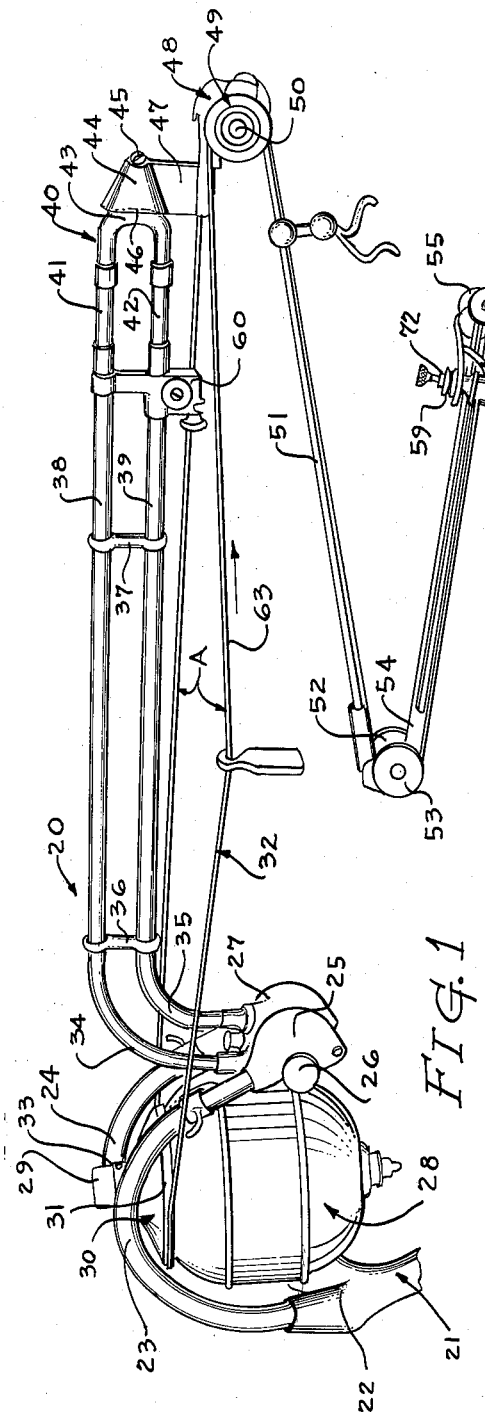
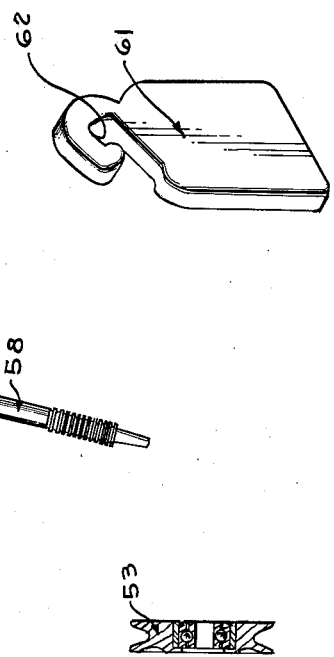
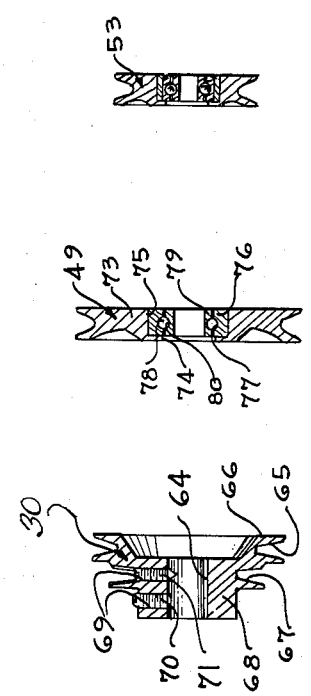
INVENTOR.
Martin Staunt
BY Robert H. Wendt
Attorney

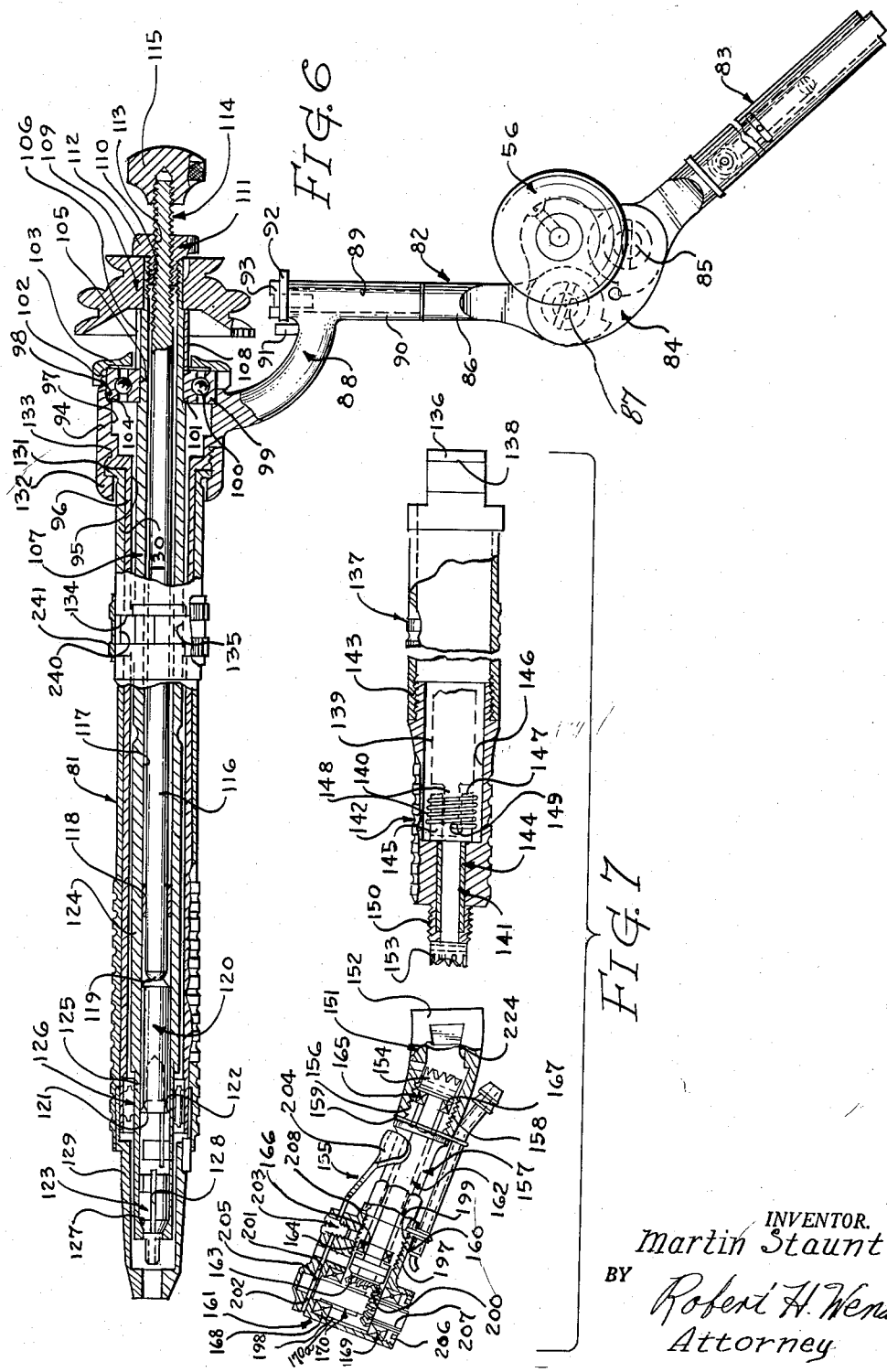

June 20, 1961

M. STAUNT 2,988,815

DENTAL HAND PIECES

Filed Nov. 5, 1956

INVENTOR.
Martin Staunt
BY Robert H. Wendt
Attorney

June 20, 1961 M. STAUNT 2,988,815
DENTAL HAND PIECES
Filed Nov. 5, 1956 4 Sheets-Sheet 4
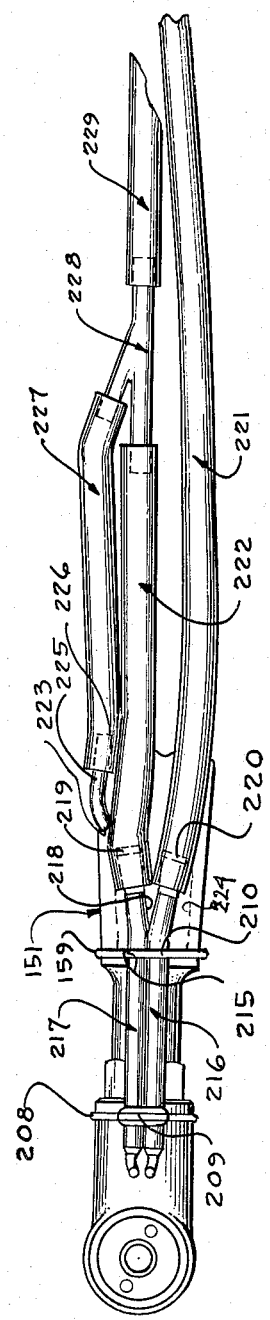
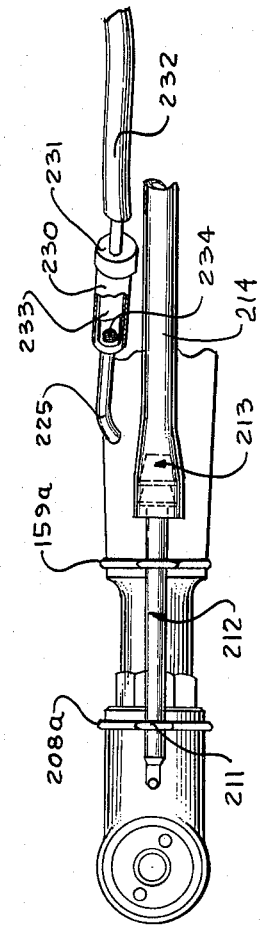
INVENTOR.
Martin Staunt
BY Robert H Wendt
Attorney United States Patent Office 2,988,815
Patented June 20, 1961

2,988,815
DENTAL HAND PIECES
Martin Staunt, Des Plaines, Ill.
(1980 N. Hawthorn Ave., Melrose Park, Ill.)
Filed Nov. 5, 1956, Ser. No. 620,434
7 Claims. (Cl. 32—27)

The present invention relates to dental hand pieces, and is particularly concerned with the provision of improved dental hand pieces adapted to be operated at higher rotative speeds.

One of the objects of the invention is the provision of improved dental hand pieces adapted to be operated at rotative speeds amounting to 50,000 r.p.m. or higher, and which will run cooler and more smoothly and also more quietly than the devices of the prior art.

Another object of the invention is the provision of improved dental hand pieces with higher operating speeds, which will enable the dentists to accomplish their work with greater ease and speed, reducing the cavity preparation time to a fraction of that formerly required by the devices of the prior art.

Another object of the invention is the provision of improved dental hand pieces which may be operated at lighter pressures and which will produce less vibration and reduce frictional heat, all of which contribute to the result of causing less trauma to the patient.

Another object of the invention is the provision of improved hand pieces having improved bearings which are adapted to take the lateral and axial thrust that is placed upon them by use of the hand pieces, and which operate more smoothly and with less vibration and noise, and at greater speeds than the devices of the prior art.

Another object of the invention is the provision of an improved hand piece assembly which is adapted to be used with the burrs and contra angles and other attachments of the prior art, but which is also adapted to be used with a plurality of high speed attachments, any one of which is quickly substituted for another in the assembly, thereby enabling the user to have available a plurality of different hand piece assemblies by merely purchasing one hand piece and the additional attachments.

Other objects and advantages of the invention will be apparent from the following description and the accompanying drawings, in which similar characters of reference indicate similar parts throughout the several views.

Referring to the drawings, of which there are four sheets, accompanying the specification, FIG. 1 is a fragmentary side elevational view of a dental engine and hand piece assembly embodying the invention;

FIG. 2 is a sectional view taken through a higher speed pulley for the dental engine;

FIG. 3 is a similar view of an improved form of idler pulley;

FIG. 4 is a similar view of another form of idler pulley;

FIG. 5 is a view in perspective of a belt tension adjusting weight;

FIG. 6 is a fragmentary axial sectional view taken through an improved hand piece assembly embodying the invention;

FIG. 7 is an exploded view of a modification having an improved high speed drive and improved contra angle;

FIG. 10 is a fragmentary side elevational view of a contra angle attachment utilizing air and water for cooling the tool and air under pressure for keeping foreign matter out of the contra angle;

FIG. 11 is a similar view showing the assembly when water and air are directed from a single nozzle and air is also used separately for providing air pressure inside the contra angle housing;

Figure 8:
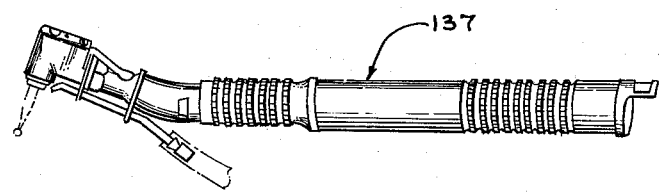
FIG. 8 is a side elevational view of the contra angle assembly of FIG. 7.

Referring to FIGS. 1-5, 20 indicates in its entirety the dental engine assembly, which is supported from a bracket 21 carried by the wall or by the column which supports the dental engine and other accessories.

The bracket 21 has a fork 22 at its top supporting a pair of curved tubular gooseneck members 23, 24 provided with a pair of bearings 25 at their ends for supporting a shaft 26. The shaft 26 rotatably supports a bearing fixture 27, which is fixedly secured to a drive motor housing 28; and the drive motor has a vertical shaft 29 carrying a pulley 30 for driving the hand piece.

The pulley 30 is outwardly convex and inwardly concave so that it extends down about the round motor housing 28, between the gooseneck arms 23, 24, and is spaced from the motor housing. At its larger edge the pulley 30 has a V groove 31 for driving an endless belt 32; and at its smaller end it has a V groove 33 of smaller diameter for driving the belt 32 at a slower speed.

The fixture 27 carries a pair of upwardly extending trombone arms 34, 35, which are joined by transverse frame members 36, 37 supporting the tubes 38, 39, which are parallel to each other. The tubes 38, 39 slidably support the trombone extension 40, which has a pair of tubes 41, 42 slidably mounted in the tubes 38, 39 and joined by a U-shaped member 43, which carries an idler supporting bracket 44 secured thereto by a screw bolt 45, and having an oval socket 46 receiving the end of the U member 43.

The bracket 44 carries a lateral extension 47 to which an idler supporting body 48 is secured, supporting a pair of ball bearing idlers 49 on studs 50, and having their grooves so located that they are all on a line with the groove 31 on the periphery of the enlarged pulley 30.

The body 48 carries an extension arm 51 which is pivotally secured to another idler supporting body 52 having a pair of idler pulleys 53 and pivotally supporting another extension arm 54, which has an idler supporting body 55 carrying a pair of idler pulleys 56.

The body 55 carries a wrist joint 57 supporting a dental hand piece 58 having a pulley 59 with a pair of grooves.

The endless belt 32 extends about the pulley 30, over the idlers 49, idlers 53, idlers 56, and about the pulley 59 of the hand piece 58.

The trombone arm 40 is provided with a rack in the body 60 on the tube 42 for adjusting the U-shaped end of the trombone arm and adjusting the tension of the belt 32. If the tension of the belt is not at a critical value, as is necessary according to the present invention, the belt may jump off the pulleys when load is suddenly placed on the hand piece or when the motor is suddenly stopped.

Correct engine belt adjustment is very important because an improperly adjusted belt can result in a speed loss up to 9,000 r.p.m. For this purpose the belt adjustment weight 61 is provided, comprising a metal plate having a centrally located rounded hook formation 62 at the top for mounting the weight on one of the stretches 63 of the belt, which is moving in the direction of the arrow in FIG. 1, toward the idler pulleys 49.

By using this weight on the belt, the amount of tension can be judged by the amount of sag of the belt; and the trombone arm adjustment 60 may be moved until the sag of the belt reaches a predetermined amount, indicated by the letter "A" in FIG. 1. Thus the tension of the belt may be measured and proper tension insured, which will eliminate speed losses due to improper tension.

Referring to FIG. 2, this is an axial sectional view of the pulley 30 carried by the engine spindle. This pulley has a through bore 64 for receiving the engine spindle and is provided with a V groove 65 on its larger portion 66 and a second V groove 67 on its smaller hub 68.

The hub is provided with a pair of threaded bores 69 having set screws 70, 71 by means of which the pulley may be secured to engine spindle 29.

Referring to FIGS. 3 and 4, these are axial sectional views of a pair of idler pulleys 49 and 53 of different sizes, which idler pulleys are preferably of the ball bearing type. Each idler pulley comprises a circular body 73 having a through bore 74 and a smaller counterbore 75.

The counterbore 75 contains an outer race 76 formed with a groove 77 for receiving the balls 78; and the balls engage an inner race 79, likewise formed with a groove 80 for receiving the balls. Such ball bearings, when used as the idlers 49, 53, or 56, aid greatly in raising the speeds permitted without excessive vibration, and reduce friction and wear, which would otherwise be excessive at the high speeds.

Referring to FIGS. 6 and 7, these are views of another hand piece attachment, which may be employed in the combination of FIG. 1; and the parts of this attachment are as follows:

81 indicates the handpiece of FIG. 6, which is carried by a wrist joint assembly 82, comprising the usual detachable extension 83 pivotally supported upon an elbow 84 by the screw bolt 85.

The elbow 84 also supports another arm 86 by means of screw bolt 87; and the arm 86 rotatably supports the wrist joint member 88 by means of a reduced extension 89 carrying a tubular member 90. The wrist joint has a stop pin 91; and the reduced extension 89 has a stop washer 92 secured by a screw bolt 93 threaded into the reduced extension 89, limiting the rotative movement of the wrist joint 88 on the reduced extension 89.

The wrist joint 88 carries a tubular body 94 having a bore 95 in a tube 96, and having an enlarged counterbore 97 communicating with a larger bore 98 adapted to receive the outer ball bearing race 99. Race 99 contains the balls 100, which also engage a groove in the inner race 101.

The tubular body 94 has a threaded end portion 102 for receiving the internally threaded cap 103, which holds the outer race 99 in the bore 98 against an annular shoulder 104. The inner race 101 has a cylindrical bore 105 receiving a reduced cylindrical portion 106 of the hand piece spindle 107, rotatably mounting the spindle 107 at its rear end.

The spindle 107 carries a tubular spacing sleeve 108 engaging the inner race 101 and also engaged by the pulley 109, which is similar to the pulley 59, previously described. The spindle 107 is internally threaded at 110 to receive the externally threaded plug 111 having a noncircular head 112 securing the pulley 109 on the spindle, and also engaging sleeve 108.

Plug 111 has a threaded bore 113 for receiving the threaded chuck rod 114 having a knurled head 115 threaded thereon. Chuck rod 114 has a cylindrical body 116 extending through the bore 117 of the spindle 107 and guided by a bearing sleeve 118 near its end.

The end of the chuck rod 114 is rounded at 119 and engages an expander member 120 having a frusto-conical socket 121 for engaging the complementary end 122 of a collet 123.

The spindle 107 has an elongated tubular portion 124 with a reduced cylindrical portion 125 supporting the roller bearing assemblies 126, which may be of the type disclosed in my prior application, Ser. No. 494,607, now abandoned, on Dental Hand Pieces, filed March 16, 1955. A pair of ball bearings may replace the roller bearings at 126.

The rollers of these bearings 126 engage the reduced portion 125 and rotatably support the tool end of the spindle. The reduced portion 126 of the spindle has its bore 117 provided with a frusto-conical end portion 127 engaging the opposite frusto-conical end of the collet 123, which has the axial splits 128, permitting the collet to be contracted to grasp a tool shank.

The tubular body 94 of the wrist joint has the tubular extension 96 about the spindle for supporting the races of the roller bearings 126 and supporting the nose housing 129, which encloses the collet and is adapted to receive the end of the housing of existing contra angles having a stem that is engaged by the collet 123.

The wrist joint tubular extension 96 supports a housing tube 130 having a radially extending flange 131 secured by an internally threaded sleeve 132 threaded at 133 on the wrist joint tubular member 94.

The housing 130 is located with a peripheral grooved end portion 134 having a longitudinally extending slot 135 for receiving the longitudinally extending complementary portion 136 of an attachment sleeve 137 having a peripheral groove 138.

The extension sleeve 137 provides a housing for a spindle extension 139 of a different type having a pair of longitudinally extending lugs 140 for driving a shaft 141. The shaft 141 is rotatably mounted in a housing extension 142 which is threaded at 143 to receive the sleeve 137, and which has an elongated nylon bearing 144 for the shaft 141.

The shaft 141 carries a universal drive fixture 145 at its right end in the bore 146 of housing 142 and provided with a pair of spaced axial lugs 147 engaging the axial lugs 140 on the spindle extension 139, as described in my prior application.

The present drive is an improvement over my prior application in that the lugs 147 on the driven fixture 145 are surrounded by a helical coil spring 148 having one end anchored by soldering at 149 to the body of fixture 145. This coil spring 148 greatly improves the smoothness of the drive of these lugs 140 and 147 for high speed operation.

The housing 142 has a reduced threaded plug extension 150 adapted to be threaded into a contra angle extension housing 151 having a threaded bore 152; and the reduced threaded plug extension 150 is long enough to locate the gear 153 in the contra angle extension housing 151, in engagement with the gear 154.

The housing 151 provides an obtuse angle portion for supporting the contra angle 155 at the desired angle for operation; and housing 151 has internal threads 156 at its opposite end.

Gears 153 and 154 have longitudinally extending teeth engaged only at one side by virtue of the angularity of the housing 151; and one of these gears is preferably of stainless steel, while the other is preferably of molded nylon, which also enables the drive of the contra angle at speeds of 50,000 r.p.m. or higher.

The angular housing 151 supports a tubular member 157 which has a reduced threaded portion 158 threaded into the threaded end 156. The reduced threaded portion 158 carries a flat metal plate 159 by means of a bore; and plate 159 is clamped between the tubular member 157 and the end of the housing 151.

At its other end the tubular member 157 has a reduced threaded portion 160 to be threaded into the contra angle head 161; and a shaft 162 extends through the tubular member 157 and is provided with gear 154 at one end and with a bevel gear 163 at the other end.

These gears are pinned to shaft 162; and shaft 162 is rotatably supported at both of its ends by the ball bearing assemblies 164, 165, further to be described. Each of these ball bearing assemblies is mounted in a counterbore 166, 167 in the end of tubular member 157;

and each has inner and outer races, further to be described, the outer race engaging in the counterbore 167 or 166, and the inner race supporting the shaft 162.

Figure 12:
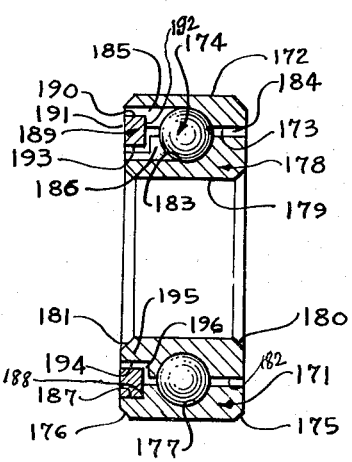
FIG. 12 is an axial sectional view of an improved form of ball bearing used in the contra angle and other parts.

Referring to FIG. 12, this is an enlarged view showing the details of the ball bearings, which are preferably employed everywhere in this hand piece or contra angle where ball bearings are indicated. In particular, these ball bearings are employed in the contra angle head 161, where ball bearings are indicated at 168 and 169 on the tool shaft 170.

The ball bearing assemblies of FIG. 12 include an outer race 171, which may have a cylindrical outer surface 172 and a cylindrical bore 173. The balls used are indicated at 174; and these may be hardened steel balls.

The outer race 171 may have its corners chamfered at 175, 176; and it is provided with an inner ball groove 177, which is partially circular in cross section and on a radius slightly larger than the radius of the balls 174.

The inner race 178 comprises a hardened steel member like the outer race 171, having an inner cylindrical bore 179 with corners chamfered at 180, 181.

The inner race 178 has an outer cylindrical surface 182 and an inner ball groove 183 on its periphery, the groove being partially circular in cross section and on a radius slightly larger than the balls 174.

The grooves 183 and 177 in these races differ from the prior art in that they are of maximum depth adapted to receive almost half of the diameter of the balls 174, leaving only a slight clearance at 184 between the inner cylindrical surface 173 of the outer race and the outer cylindrical surface 182 of the inner race.

Thus the grooves 183 and 177 are much deeper than the ball grooves of the prior art, and in fact are almost half circular in size. At one end of the race assembly the races are provided with a loading opening comprising an axial groove 185 in the outer race 171 and an axial groove 186 in the inner race.

These loading openings formed by the two grooves 185, 186 are circular or cylindrical in shape and of slightly larger diameter than the balls 174 so that the balls may be moved into the race grooves 177 and 183 through the loading openings.

The outer race 171 has a counterbore of larger diameter at 187 in the end which has the loading opening; and the counterbore terminates at an annular shoulder 188 adapted to provide a seat for a nylon or Teflon seal ring 189.

The seal ring 189 has an external cylindrical surface 190 and has plane ends 191 and 192 and an inner cylindrical surface 193, which comes very close to the outer cylindrical surface 194 on the reduced portion 195 of the inner race 178.

The clearance at 196 between seal ring 189 and cylindrical surface 194 is reduced to a minimum without contact; and this aids in excluding foreign matter from the interior of the races 178 and 171, but permits ventilation of these races by air pressure inside the contra angle housing.

Under some conditions the seal 189 may also be used for retaining heavy lubricant inside the ball bearing races. The seal 189 also closes the loading opening formed by grooves 185 and 186 and prevents the balls from jumping out into the loading opening.

The present ball bearing assemblies are installed by having their outer cylindrical surfaces 172 of the outer race in every case frictionally secured in a cylindrical bore and by having their inner cylindrical surfaces 179 of the inner race 178 frictionally secured on a reduced portion of a shaft against an annular shoulder, as shown in FIG. 7.

The contra angle head 161 comprises a housing member having a laterally extending tubular portion 197 at right angles to another tubular portion 198, these tubular portions communicating with each other. The tubular portion 197 has internal threads 199 receiving the threaded reduced portion of the tubular member 157 and permitting the bevel gear 163 to project into the tubular portion 197, where it engages the bevel gear 200 on the tool shaft 170.

One of these bevel gears is preferably stainless steel, while the other is of molded nylon, for the purpose of promoting a smoother operation at higher speeds. Bevel gear 200 and tubular tool shaft 170 form one integral molded nylon tool holder and bevel gear.

The tubular body 197 has a lateral slot 201 for receiving the sheet metal tool shank securing member 202, which is pivotally mounted on the screw bolt 203 and has an axial extension with a curved portion 204 engaging the outside of tubular member 157 resiliently.

At its left end this tool shank securing member has a slot engaging about the grooved end of a tool shank at 205 for use with tool shanks of the prior art. The tool shaft 170 comprises a tubular member having rotatable engagement with the inner races of ball bearings 168 and 169.

A stainless steel spacer tube 170a engages the ends of the outer races of bearings 168, 169, and tube 170a fits inside the tubular portion 198, but is cut away to clear the driving gear 163. Bearings 168, 169 are constructed as shown in FIG. 12.

The tool shaft 170 carries the bevel gear 200, which is engaged by the inner race of bearing 169; and the outer race of this bearing is secured by a threaded ferrule 206 threaded into the end of the housing 198. The tool shaft 170 has an axial bore 207 for receiving burr shanks and other tool shanks.

The reduced portion 160 of tubular housing 157 also carries a metal plate 208 like the plate 159, having an aperture; and plate 208 is clamped between tubular portion 197 and housing 157. These plates 159 and 208 are used to support air and water nozzles, the structures of which are shown in greater detail in FIGS. 10 and 11.

Each supporting plate 159, 208 has a radial extension 209, 210; and this radial extension in FIG. 11 is large enough to have an aperture 211 for one metal tube 212, which may be used for both water and air. The tube 212 is soldered at the aperture 211 to the plate 208a, rigidly supporting the tube 212, which has a ribbed end portion 213 for receiving the resilient flexible plastic tube 214 that supplies both water and air.

Referring to FIG. 10, here the radially extending lugs 209 and 210 are wide enough to provide apertures 215 for receiving a pair of metal tubes 216, 217 side by side, and preferably soldered together and soldered to the plates 159 and 208.

These metal tubes 216, 217 preferably spread into a Y formation 218 at the right, where they have externally ribbed enlargements 219 and 220 for receiving the separate flexible, resilient plastic tubes 221 and 222 for separate supplies of water and air under pressure.

The angular housing 151 of the contra angle is preferably formed with an aperture at 223 leading to its interior bore 224, FIG. 7, and having a metal tube 225 mounted therein in either FIG. 10 or FIG. 11. This tube 225 has an externally ribbed end portion 226 for receiving a flexible, resilient plastic tube 227 in each case for supplying air and oil under pressure to the interior of the contra angle housing.

The air and oil escapes from the working end of the contra angle housing 198 through the ball bearings and inside the threaded ring 206, and provides a constant supply of air and oil escaping from those portions of the contra angle which would otherwise tend to receive foreign matter, such as saliva, grindings, water or the like. Since there is air and oil under pressure inside the contra angle housing, all foreign matter will be driven out; and the tendency will be to keep the contra angle bearings clean, lubricated, and free of saliva and water and foreign matter.

In FIG. 10 the two air tubes 222 and 227 may be joined by a Y-shaped tubular fitting 228 to a single air tube 229.

Referring to FIG. 11, 230 indicates a reservoir comprising a metal chamber having a cap 231 and connected in the air line 225 by a tube 232. The reservoir 230 may contain a lubricator having a nontoxic and edible form of lubricant through which the air passes and picks up the lubricant as a mist to be deposited on the bearings of the contra angle as the air passes through the contra angle.

The lubricator 233, which is removable and renewable, may have fine mesh screens in its ends at 234, permitting only a measured amount of lubricant to be delivered over a period of time.

As the lubricant is nontoxic and edible, any which passes out of the clearances around the tool shank in the contra angle may be mixed with the saliva and water, and causes no harm to the patient.

The present attachments, such as the attachment 137 (FIG. 7), are secured to the hand piece sleeve 130 by means of a rotatable ring 240, which slides in the groove 138 and is actuated by a collar 241, as described in my prior application, above mentioned.

Referring to FIG. 8, this is a side elevational view of the contra angle attachment of FIG. 7, shown assembled with the removable sleeve 137.

Figure 9:
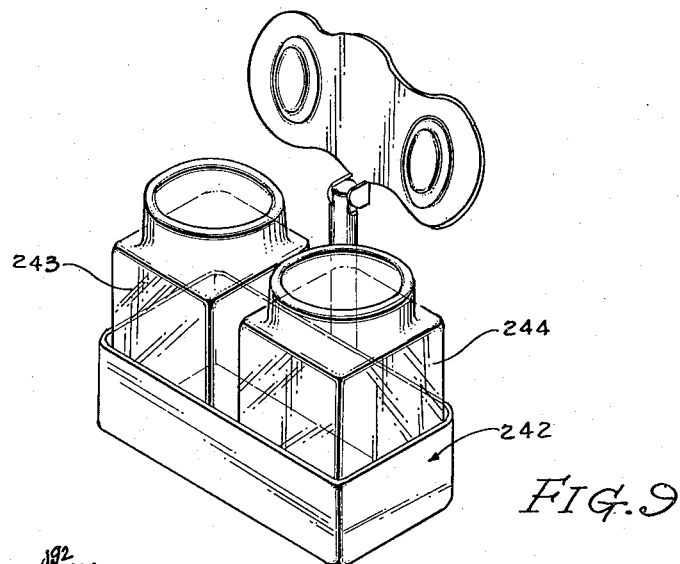
FIG. 9 is a view in perspective of a cleaner and lubricant kit.

Referring to FIG. 9, this is a view in perspective of a cleaning and lubricating accessory, comprising a casing 242 for a pair of bottles 243, 244 for containing a hand piece cleaner and hand piece lubricant.

When the hand piece attachment is not provided with a continuous lubricator or oiler nor with air under pressure inside the contra angle housing, it is necessary to clean the contra angle and lubricate it after each patient. Even a straight hand piece of the sleeve bearing type or ball bearing type should be cleaned once a day by immersion in the cleaner and thereafter in the lubricant contained in these bottles; and the hand piece should be run at a moderate speed in the cleaner or lubricant.

The gears then act like a pump and draw in the cleaner, and later the lubricant.

With the present improved structures the hand piece may be operated at speeds from 1500 r.p.m. to 50,000 r.p.m. or more, depending upon the capabilities of the engine. The present hand pieces and attachments may be operated at these high speeds with less heat and with less wear on the parts and less possibility of the tool shaft becoming stuck, as it might do because of expansion and contraction, when sleeve bearings are used.

With my ball bearing construction, the rotating parts can never become stuck during a cavity preparation, as such an accident should always be avoided because it might damage both the patient and the dentist.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A contra angle attachment for dental hand pieces, comprising a sheath having an internally threaded end and containing a rotatable spindle, having a pair of axially extending drive lugs widely spaced from each other on its driving end, a bearing housing joined to said sheath and having a complementary externally threaded end, and having a bearing with a rotating shaft having similar widely spaced axial driving lugs on its driven end to engage between the first-mentioned lugs, a coil spring having one end turned radially inward and anchored in one of said lugs, said coil spring surrounding the assembly of lugs and maintaining their alignment, although the lugs are widely spaced from each other peripherally, a driving gear with V teeth and V tooth spaces on the end of said shaft, a threaded plug on said bearing housing, a contra angle housing having a threaded bore supporting said threaded plug, and having a V tooth gear engaging the V teeth of said driving gear and located in an obtuse elbow, a driven shaft carrying said V tooth gear, and a tool supporting shaft in said contra angle housing, and extending at right angles to the latter driven shaft, both said driven shaft and said tool shaft being supported by ball bearings at each end, engaging gears on said driven shaft and said tool shaft a reservoir for lubricant, a supply of edible lubricant in said reservoir, an air tube conducting air under pressure to said reservoir and from said reservoir to the inside of said contra angle housing, the air and lubricant leaking out through the ball bearings at the tool end of the contra angle, lubricating the bearings and maintaining pressure on the contra angle to exclude dirt by internal pressure and outward leakage of air.

2. A contra angle attachment according to claim 1, in which the contra angle housing has a threaded end and an annular shoulder, and a metal plate, having an aperture receiving said threaded end, and being clamped against said annular shoulder, said plate each having a radial lug, said lug having an aperture, and a water tube soldered in said aperture, and having a nozzle directed at the tool end to direct water at the end of the tool in said contra angle.

3. A contra angle attachment for dental hand pieces comprising a sheath having a threaded end, and containing a rotatable spindle mounted in a bearing in the end of such sheath, said spindle supporting a first driving pinion with axially extending V-shaped teeth, an elbow housing having an internally threaded end and engaging said sheath and surrounding said first pinion, a tubular housing provided with a bearing and having a first rotatable shaft protruding from a threaded end threaded into said elbow, said shaft supporting a second driven pinion having axially extending V-shaped teeth engaging the teeth of said first pinion, a conduit communicating with an aperture in said elbow housing and adapted to conduct an oil mist into said housing for lubricating said pinions and placing a pressure on the inside of said housing, a contra angle housing having a threaded bore adapted to be threaded on the other end of said tubular housing and having a transverse bore, a third driven pinion in said contra angle housing on the end of said first shaft, a tubular shaft in said transverse bore for supporting a burr and having a fourth pinion driven with said third driven pinion and a conduit for conducting air containing oil mist into the housing and thence through the bearings surrounding said driven shaft and said latter tubular shaft and lubricating the bearings and pinions and supplying the contra angle housing with air and oil mist under pressure to exclude grindings and foreign matter from the interior of the contra angle housing.

4. A contra angle attachment for dental hand pieces according to claim 3 in which the driven shaft and the tubular shaft are both supported by ball bearings, each ball bearing includng a pair of races and balls between the races, the air and oil mist leaking through the bearings from the elbow housing to the contra angle housing, from which the oil mist is permitted to escape to maintain the pressure inside the contra angle housing.

5. A high speed dental handpiece contra angle comprising a substantially cylindrical head housing having a cylindrical bore and having a lateral cylindrical extension provided with a transverse communicating bore, a pair of outer ball bearing races in said head housing and spaced from each other by a cylindrical sleeve in said head housing, having a lateral opening communicating with said transverse bore, one of said outer races engaging an end wall in said head housing, and the other outer race being engaged by a threaded member having outer threads engaged in inner threads in said head housing, and having a central aperture, a tool shaft having an axial bore for receiving a burr shank, said shaft having a pair of annular shoulders, a pair of inner races engaging said annular shoulders, and registering with said outer races, balls in said races, a resilient plastic sleeve in the lower end of said shaft bore for gripping a burr shank, a source of air under pressure with an air conduit extending from said source, an external oil reservoir connected to said conduit, a second conduit connecting said reservoir and the lateral extension of said head housing, said second conduit carrying air under pressure entraining oil mist from said reservoir into said head housing, and the air passing through the ball bearings and depositing oil on the balls for continuous lubrication.

6. A contra angle according to claim 5, having a pair of metal tubes carrying air and water secured to said head housing and having nozzle ends directing air and water toward a cutting tool carried by said tool shaft.

7. A contra angle according to claim 5, having a single metal tube carrying fluid coolant secured to said head and having a nozzle end directing coolant toward a cutting tool carried by said tool shaft.

References Cited in the file of this patent

UNITED STATES PATENTS

| | | |
|---|---|---|
| 184,992 | Starr | Dec. 5, 1876 |
| 1,371,090 | Hess | Mar. 8, 1921 |
| 1,380,717 | Herman | June 7, 1921 |
| 1,484,811 | Corn | Feb. 26, 1924 |
| 2,010,421 | Terry | Aug. 6, 1935 |
| 2,180,993 | Monnier | Nov. 21, 1939 |
| 2,279,887 | Hathorn | Apr. 14, 1942 |
| 2,283,314 | Ckola | May 19, 1942 |
| 2,442,033 | Brantly et al. | May 25, 1948 |
| 2,541,790 | Sogden et al. | Feb. 13, 1951 |
| 2,551,458 | Page | May 1, 1951 |
| 2,643,165 | Potter | June 23, 1953 |
| 2,764,815 | Barksdale | Oct. 2, 1956 |
| 2,776,488 | Brown | Jan. 8, 1957 |
| 2,838,837 | Terry | June 17, 1958 |

OTHER REFERENCES

Rothbart, H. A.: "Cams," TJ 206 R6 C.2, Div. 12, 1956, John Wiley & Sons.